UNITED STATES PATENT OFFICE.

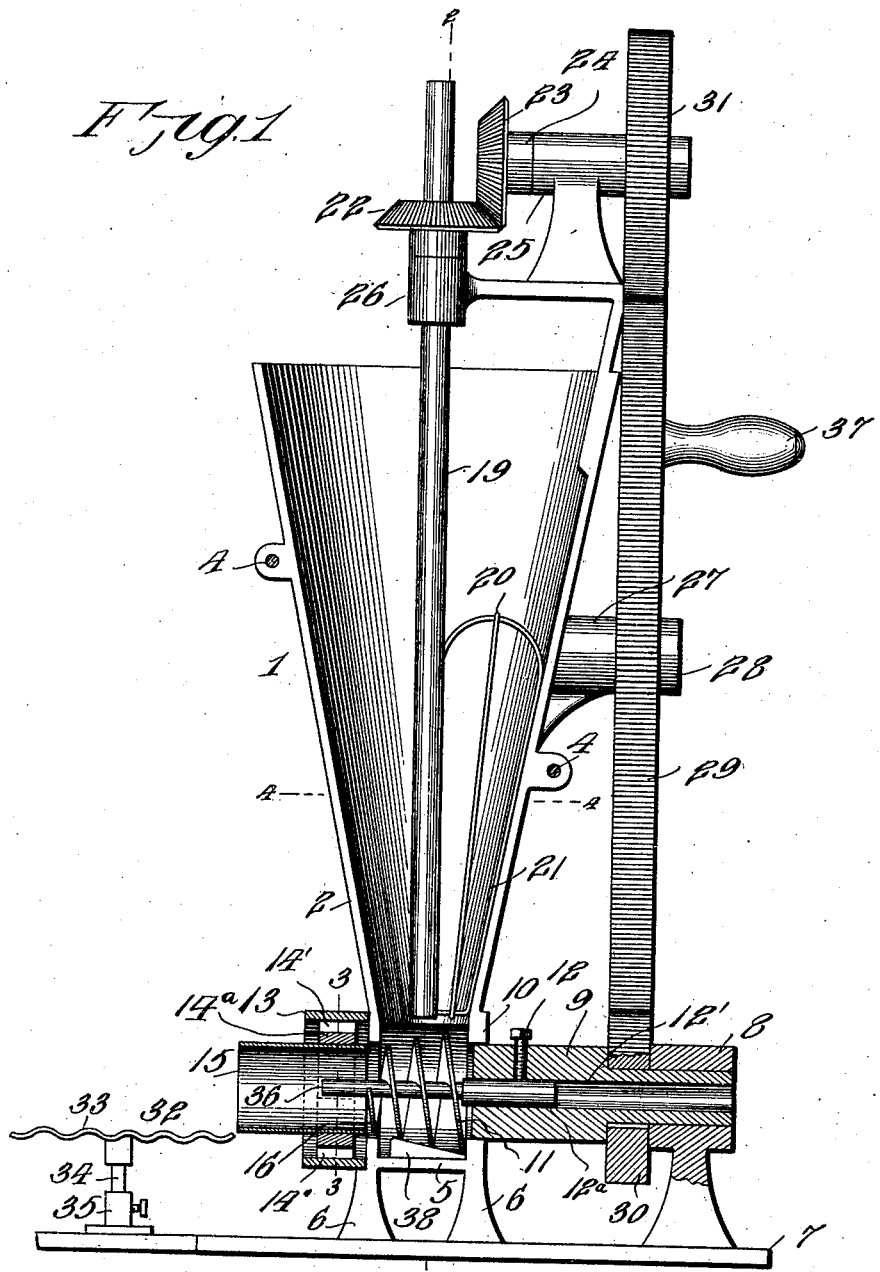

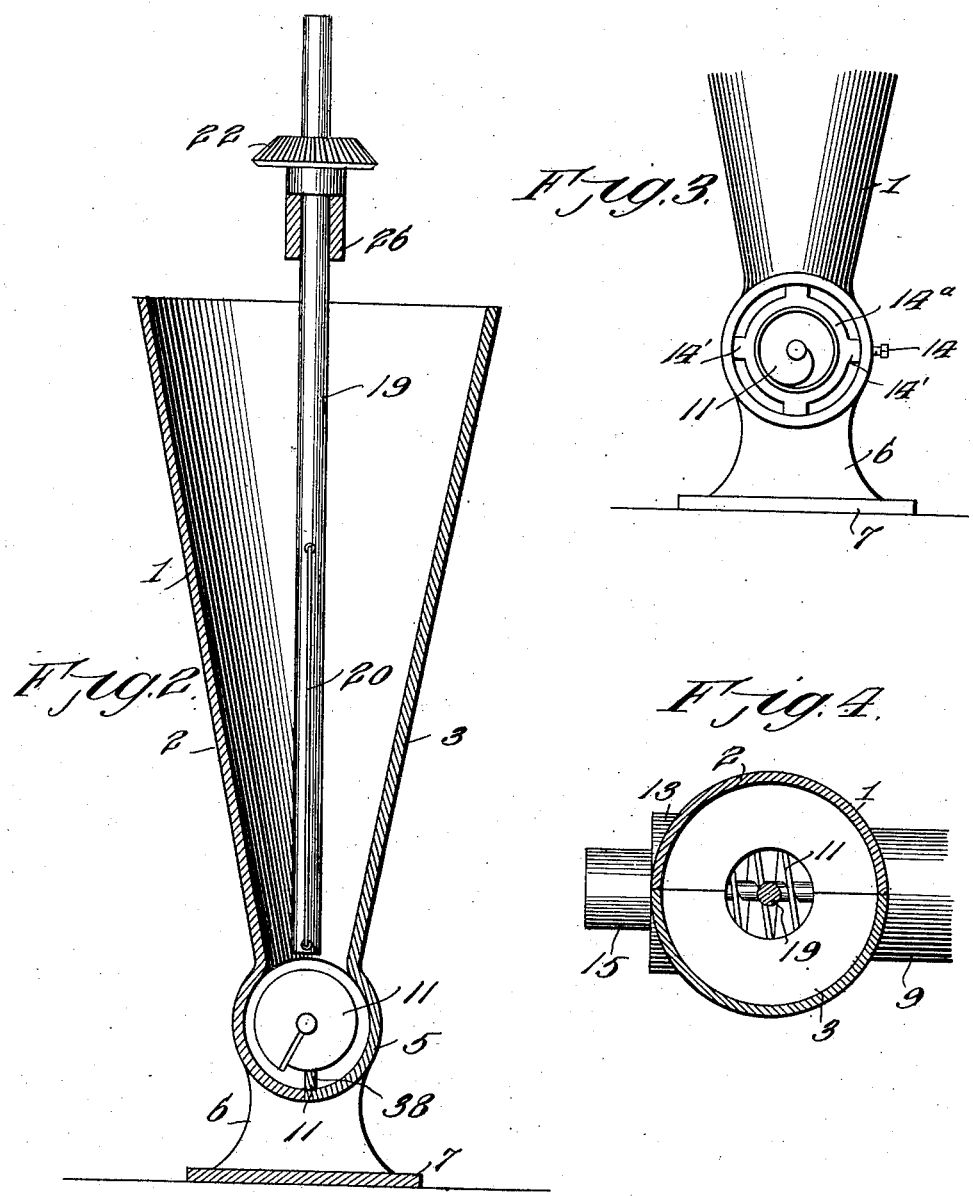

LEO MICHAEL HENNESSY, OF PROVIDENCE, RHODE ISLAND.

SAND-CORE-FORMING MACHINE.

986,980. Specification of Letters Patent. Patented Mar. 14, 1911.

Application filed October 29, 1910. Serial No. 589,769.

*To all whom it may concern:*

Be it known that I, LEO M. HENNESSY, a citizen of the United States of America, residing at Providence, in the county of Providence and State of Rhode Island, have invented new and useful Improvements in Sand-Core-Forming Machines, of which the following is a specification.

This invention relates to sand core-forming machines, and has for an object to provide means for simultaneously operating the agitator and the feed or conveying screw at different rates of speed so as to cause a positive discharge of the material to the said feed screw and to cause a positive discharge of the sand from the conveying screw and prevent clogging of the sand in the feed screw.

Another object of the invention is to provide a support for the interchangeable association therewith of core-forming tubes of different sizes so that a core of the desired or required size can be formed.

Another object of the invention is to provide an adjustable corrugated support which may be adjusted to lie in line with the core-forming tube to receive the core therefrom.

In the drawings, forming a portion of this specification and in which like numerals of reference indicate similar parts in the several views:—Figure 1 is an end view of my improved core former, parts being removed to clearly disclose the invention, parts being shown in section. Fig. 2 is a detail vertical section taken on the line 2—2 of Fig. 1. Fig. 3 is an end view of a portion of the former. Fig. 4 is a detail horizontal section taken on the line 4—4 of Fig. 1.

My improved core former comprises a hopper 1 which is formed of the sections 2 and 3 which are connected with each other by set screws or other equivalent fastening devices 4. The sections of the hopper are formed at their lower ends to form a base 5 of tube-like form, the said tube being co-extensive with the smallest end of said hopper. The base 5 is provided with supporting legs 6 which arise from a suitable support 7. The support 7 is provided with an end bearing 8 through which an actuating shaft 9 extends. This shaft also extends through the bearing 10 in the tube-like base portion 5 of the hopper and removably fitted to that portion of the shaft which is disposed in the said tube-like base 5 of the hopper is a spiral feed or conveying screw 11 which is co-extensive with the tube, as shown. The feed screw is detachably secured to the actuating shaft by a set screw 12, an opening 12' being formed in the shaft to receive the stem 12$^a$ of the screw.

A tube holder 13 is carried by the section 2 of the hopper, and as illustrated, the said holder is provided with a clamping member 14 which is designed for clamping engagement with one of the lugs 14' on the spider 14$^a$ of the core-forming tube 15. The member 14 can be adjusted to secure the tube 15 in line with the sand discharge passage 16 of the hopper.

From the construction just described it will be seen that feed screws or conveyers of sizes to suit the particular occasion may be interchangeably associated with the actuating shaft. The construction of the tube holder is such that a forming tube conforming in size with the feed screws can be readily associated with the tube holder.

An agitator shaft 19 extends downwardly into the hopper. This shaft is provided with an agitator 20 which is preferably constructed of wire being formed to provide arms 21 to contact with the walls of the hopper on rotation of the shaft. In a machine of the class described it is essential to provide means for rotating the feed screw at a greater rate of speed than the agitator shaft so as to prevent a too rapid a feed of the sand to such screw and to prevent the sand from hardening before it is ejected from the former. In view thereof, I provide the agitator shaft 19 with a small bevel-pinion 22 which meshes with a similar bevel-pinion 23 on a driven shaft 24. The driven shaft 24 is supported in a suitable bearing 25 which is supported by the hopper. A similar bearing 26 is supported by the hopper and it receives the shaft 19 and supports the gear wheel thereon. The hopper is provided with a horizontal bearing 27 on which is mounted a stub shaft 28. A relatively large driving gear wheel 29 is mounted on the stub shaft and it meshes with the driving gear 30 on the actuating shaft and with the driving gear 31 on the driven shaft 24. The gear wheel 31 is considerably larger than the gear wheel 30 so that the feed shaft 9 will be revolved at a greater rate of speed than the driving shaft 24 for the agitator.

A table or support 32 is located at the discharge end of the core-forming tube. This table comprises a corrugated plate 33 which is provided with a depending stem 34 which is adjustably mounted in a bracket 35 on the support 7. This construction permits adjustment of the table 33 vertically according to the size of the core-forming tube, as is obvious. The actuating shaft 9 has an end portion 36 extending into the core-forming tube so as to form in the core the required vent passage.

The construction of the machine described and illustrated herein is extremely simple and will be found most efficient in that means are employed for feeding the sand to the core former at a rate of speed greater than the speed of the agitator shaft.

The driving gear wheel 29 is provided with a crank handle 37 which will permit the machine to be operated manually. In order to prevent the sand from accumulating in the bottom of the tube-like base 11 of the hopper, I provide the feed screw with a scraping blade 38.

I claim:—

A sand core-forming machine comprising a hopper, a forming tube located at the discharge end of the hopper and arranged in direct communication therewith, a feed screw located at the discharge end of the hopper and in line with the forming tube, a spider surrounding the forming tube, and a support secured to the hopper and provided with means for detachable engagement with the spider.

In testimony whereof I affix my signature in presence of two witnesses.

LEO MICHAEL HENNESSY.

Witnesses:
JOHN F. HENNESSY,
LOUIS G. REHFUSS.

Copies of this patent may be obtained for five cents each, by addressing the "Commissioner of Patents, Washington, D. C."